US012632882B2

(12) United States Patent
Ramarao

(10) Patent No.: US 12,632,882 B2
(45) Date of Patent: May 19, 2026

(54) COMPACT DATA REPRESENTATION

(71) Applicant: Oracle International Corporation, Redwood Shores, CA (US)

(72) Inventor: Karempudi V. Ramarao, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1161 days.

(21) Appl. No.: 17/450,905

(22) Filed: Oct. 14, 2021

(65) Prior Publication Data

US 2023/0123132 A1     Apr. 20, 2023

(51) Int. Cl.
| | |
|---|---|
| *G06Q 30/0242* | (2023.01) |
| *G06F 18/211* | (2023.01) |
| *G06F 18/214* | (2023.01) |
| *G06F 18/28* | (2023.01) |
| *G06N 20/00* | (2019.01) |
| *G06Q 30/0251* | (2023.01) |

(52) U.S. Cl.
CPC ....... *G06Q 30/0243* (2013.01); *G06F 18/211* (2023.01); *G06F 18/214* (2023.01); *G06F 18/28* (2023.01); *G06N 20/00* (2019.01); *G06Q 30/0251* (2013.01); *G06Q 30/0255* (2013.01)

(58) Field of Classification Search
CPC ........................................... G06Q 30/02–0277
See application file for complete search history.

(56) References Cited

U.S. PATENT DOCUMENTS

| | | | | |
|---|---|---|---|---|
| 2011/0153423 A1* | 6/2011 | Elvekrog | ........... | G06Q 30/0255 |
| | | | | 705/14.66 |
| 2013/0204905 A1* | 8/2013 | Ioffe | ......................... | H04L 9/00 |
| | | | | 707/E17.044 |
| 2021/0224584 A1* | 7/2021 | Pouyan | ................. | G06F 18/214 |
| 2021/0374525 A1* | 12/2021 | Bremer | .................. | G06N 3/045 |

(Continued)

FOREIGN PATENT DOCUMENTS

| | | | | | |
|---|---|---|---|---|---|
| EP | 2068276 A1 | * | 6/2009 | ......... | G06F 16/9535 |

OTHER PUBLICATIONS

P. Mitra, C. A. Murthy and S. K. Pal, "Data condensation in large databases by incremental learning with support vector machines," Proceedings 15th International Conference on Pattern Recognition. ICPR-2000, Barcelona, Spain, 2000, pp. 708-711 vol. 2, doi: 10.1109/ICPR.2000.906173 (Year: 2000).*

(Continued)

*Primary Examiner* — Marie P Brady
(74) *Attorney, Agent, or Firm* — Invoke

(57) ABSTRACT

Techniques are disclosed for transforming feature vectors to a compact form that improves the efficiency and speed of computing analytical operations. A system may generate feature vectors that correspond to a set of entities and select a subset of the feature vectors to act as reference vectors. The system executes a first stage of data condensation by representing each feature vector in terms of a distance value to each of the reference vectors thereby reducing a number of attributes in each vector to the number of selected reference vectors. The system may further condense the data by characterizing the distance values for the remaining vectors relative to each particular reference vector in terms of statistical characteristics of the distance value distribution.

20 Claims, 4 Drawing Sheets

(56)          References Cited

U.S. PATENT DOCUMENTS

2022/0083810 A1*    3/2022   Khanna ............... G06F 18/2411

OTHER PUBLICATIONS

L. Xiong, B. Póczos and J. Schneider, "Efficient Learning on Point Sets," 2013 IEEE 13th International Conference on Data Mining, Dallas, TX, USA, 2013, pp. 847-856, doi: 10.1109/ICDM.2013.59. (Year: 2013).*

Sarah Ahmed & Tayyaba Azim, "Condensing Deep Fish Vectors: To Choose or to Compress?", Pattern Recognition Applications and Methods, Jun. 16, 2018, p. 80-98. (Year: 2018).*

* cited by examiner

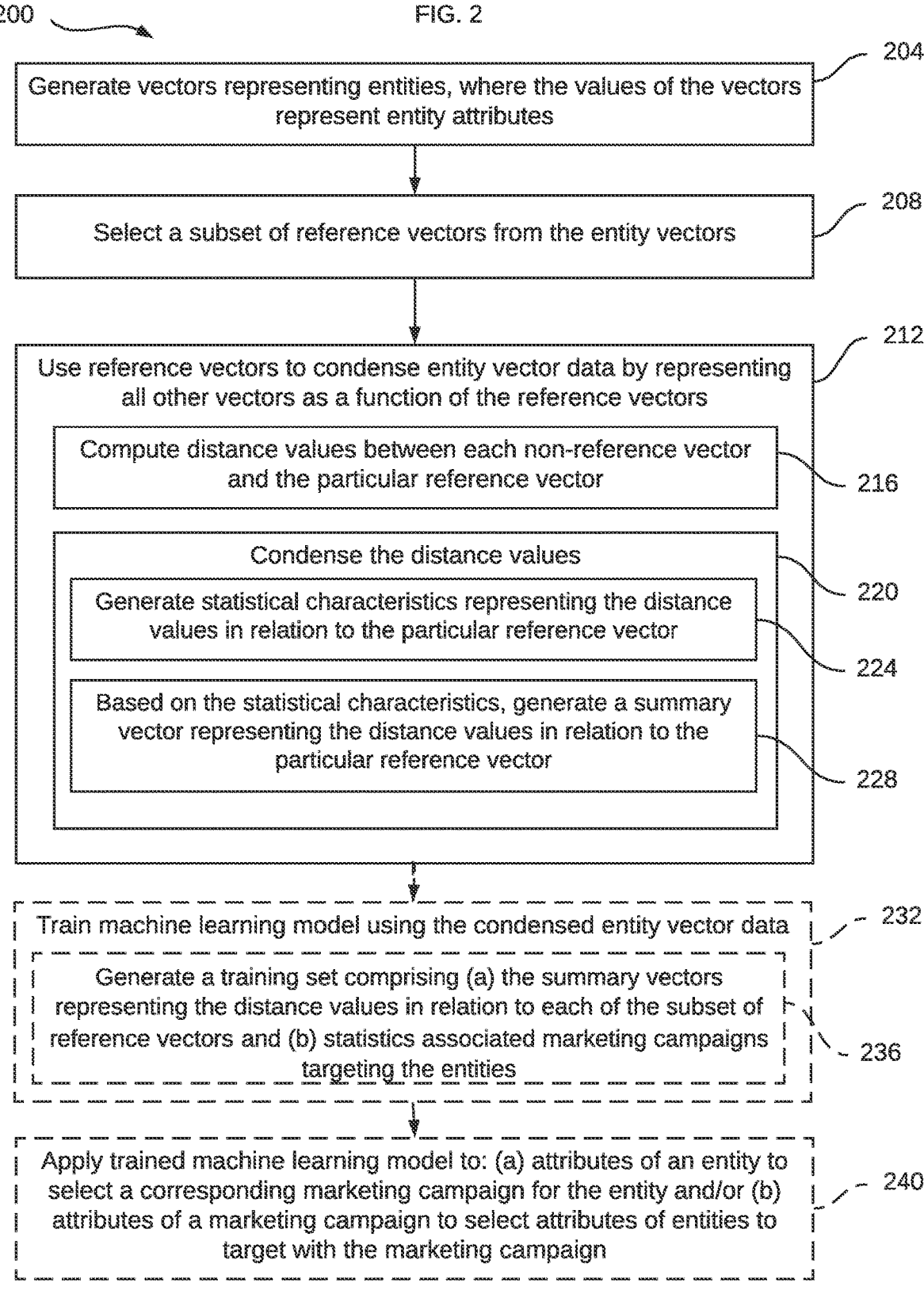

Generate vectors representing entities, where the values of the vectors represent entity attributes ⟋ 204

Select a subset of reference vectors from the entity vectors ⟋ 208

Use reference vectors to condense entity vector data by representing all other vectors as a function of the reference vectors ⟋ 212

Compute distance values between each non-reference vector and the particular reference vector — 216

Condense the distance values — 220

Generate statistical characteristics representing the distance values in relation to the particular reference vector — 224

Based on the statistical characteristics, generate a summary vector representing the distance values in relation to the particular reference vector — 228

Train machine learning model using the condensed entity vector data ⟋ 232

Generate a training set comprising (a) the summary vectors representing the distance values in relation to each of the subset of reference vectors and (b) statistics associated marketing campaigns targeting the entities — 236

Apply trained machine learning model to: (a) attributes of an entity to select a corresponding marketing campaign for the entity and/or (b) attributes of a marketing campaign to select attributes of entities to target with the marketing campaign ⟋ 240

Set of Entities 300

A | B | C | (D) | (E)

Selected Subset of Reference Entities

304

Latent Vector Space Defined by Vectors D, E

| Entity Vector | Distance to Entity D | Distance to Entity E |
|---|---|---|
| A | 10 | 8 |
| B | 3 | 10 |
| C | 6 | 2 |
| D | 0 | 0 |
| E | 0 | 0 |

| Statistic | Based on Distance Values Entity D | Based on Distance Values Entity E |
|---|---|---|
| Mean | 6.33 | 6.66 |
| Median | 6 | 8 |
| Std Dev | 3.51 | 4.16 |

COMPACT DATA REPRESENTATION

TECHNICAL FIELD

The present disclosure relates to efficient representation and analysis of data. In particular, the present disclosure relates to compact data representations.

BACKGROUND

Representing a dataset as a feature vector is a common technique used to analyze the dataset. A feature vector (or simply "vector" for brevity) may include a set of numeric values, each of which corresponds to an attribute within a dataset that describes an entity. Once a dataset is represented by a vector, the vector may be analyzed using any number of data science techniques including machine learning models. For example, in digital marketing applications, different customer segments may be represented as feature vectors, in which the values of the feature vectors correspond to the characteristic attributes of a particular segment. In an illustration of this example, one feature vector may capture demographic, geographic, and product preference characteristics for one customer segment, and another feature vector may capture the demographic, geographic, and product preference characteristics for a different customer segment. A marketing coordinator many manually define a target customer segment of customers by manually selecting one or more characteristics by which to select the target customers. These manually selected characteristics essentially filter the customers of interest from a customer database and add them to the distribution list for a campaign. Digital marketing results may be represented by their own corresponding feature vectors and analyzed to determine an effectiveness of a campaign While advances in machine learning model operations and effectiveness have increased the usefulness of feature vectors and the analytical precision of machine learning models, challenges remain. While machine learning models are sophisticated and powerful computing tools, they may still consume significant computing resources and significant amounts of time when analyzing feature vectors. Furthermore, over time the quantity and complexity of data provided to machine learning models for analysis has increased, thereby consuming even more computing resources.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2 illustrates an example set of operations for generating a compact data representation in accordance with one or more embodiments;

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GENERATING A COMPACT DATA REPRESENTATION
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

Embodiments transform feature vectors to a compact form that improves the efficiency and speed of computing analytical operations. Embodiments minimize loss of data and/or loss of analytical precision as compared to other conventional data techniques.

In one example, a system receives or generates a set of feature vectors that correspond to a set of entities and selects a subset of the feature vectors to act as reference vectors. The system executes a first stage of data condensation by representing each feature vector in terms of a distance value to each of the reference vectors. Thus, the number of attributes in the feature vectors is reduced to the number of reference vectors. The number of reference vectors is usually orders of magnitude smaller than the number of attributes in the original form of a feature vector. The system may further condense the data by characterizing the distance values for the remaining vectors relative to each particular reference vector in terms of statistical characteristics of the distance value distribution. The specific distances may then be replaced by the statistical characteristics, which further reduce the number of attributes.

One or more embodiments described in this Specification and/or recited in the claims may not be included in this General Overview section.

2. System Architecture

Figure 1:
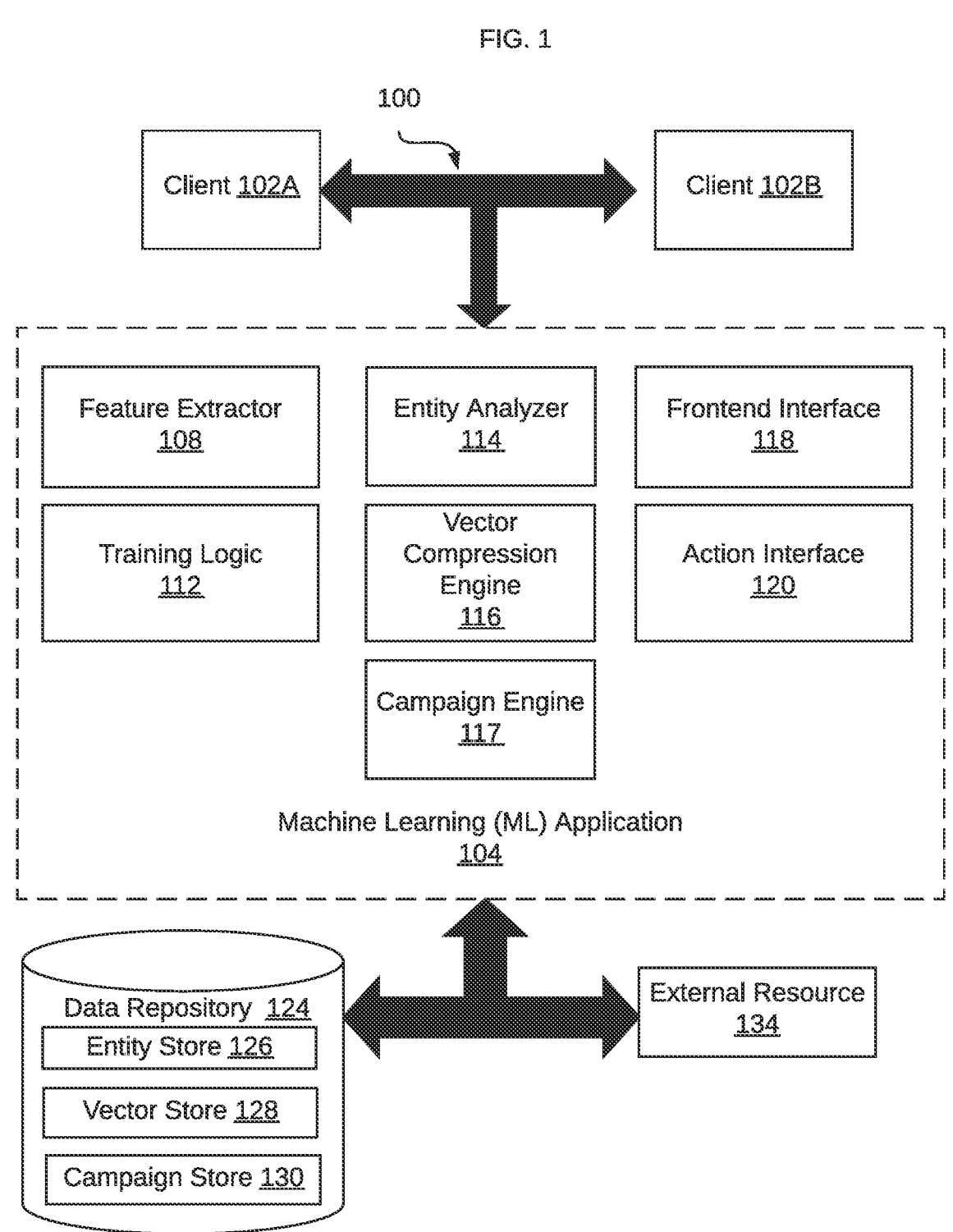
FIG. 1 illustrates a system in accordance with one or more embodiments.

FIG. 1 illustrates a system 100 in accordance with one or more embodiments. As illustrated in FIG. 1, system 100 includes clients 102A, 102B, a machine learning system 104, a data repository 124, and an external resource 134. In one or more embodiments, the system 100 may include more or fewer components than the components illustrated in FIG. 1.

The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The clients 102A, 102B may be a web browser, a mobile application, or other software application communicatively coupled to a network (e.g., via a computing device). The clients 102A, 102B may interact with other elements of the system 100 directly or via cloud services using one or more communication protocols, such as HTTP and/or other communication protocols of the Internet Protocol (IP) suite.

In some examples, one or more of the clients 102A, 102B are configured to receive and/or generate data items that are processed by the machine learning (ML) application 104 and/or stored in the data repository 124. The clients 102A, 102B may transmit the data items to the ML application 104 for analysis. The ML application 104 may analyze the transmitted data items by applying one or more trained ML models to the transmitted data items. In some examples, the ML application 104 may receive various datasets, represent the datasets as feature vectors, and compress the feature vectors according to the operations illustrated in FIG. 2. In some examples, the trained ML application may use the compressed feature vectors characterizing corresponding datasets to administer a digital marketing campaign.

The clients 102A, 102B may also include a user device configured to render a graphic user interface (GUI) generated by the ML application 104. The GUI may present an interface by which a user triggers execution of computing transactions, thereby generating and/or analyzing data items. In some examples, the GUI may include features that enable a user to view training data, classify training data, instruct the ML application 104 generate feature vectors, generate compressed representations of corresponding feature vectors, administer digital marketing campaigns, and other features of embodiments described herein. Furthermore, the clients 102A, 102B may be configured to enable a user to provide user feedback via a GUI regarding the accuracy of the ML application 104 analysis. That is, a user may label, using a GUI, an analysis generated by the ML application 104 as accurate or not accurate, thereby further revising or validating training data. This latter feature enables a user to label data analyzed by the ML application 104 so that the ML application 104 may update its training.

At a high level, the machine learning (ML) application 104 of the system 100 may be configured to train one or more ML models using training data, prepare target data before ML analysis, receive data, generate and/or receive feature vectors, compress or otherwise condense the feature vectors to improve the computing efficiency of the analysis of the feature vectors, among other features.

The machine learning application 104 includes a feature extractor 108, training logic 112, an entity analyzer 114, a vector compression engine 116, a campaign engine 117, a frontend interface 118, and an action interface 120.

The feature extractor 108 may be configured to identify characteristics associated with data items. The feature extractor 108 may generate corresponding feature vectors that represent the identified characteristics. For example, the feature extractor 108 may identify attributes within training data and/or "target" data that a trained ML model is directed to analyze. Once identified, the feature extractor 108 may extract characteristics from one or both of training data and target data.

The feature extractor 108 may tokenize some data item characteristics into tokens. The feature extractor 108 may then generate feature vectors that include a sequence of values, with each value representing a different characteristic token. In some examples, the feature extractor 108 may use a document-to-vector (colloquially described as "doc-to-vec") model to tokenize characteristics (e.g., as extracted from human readable text) and generate feature vectors corresponding to one or both of training data and target data. The example of the doc-to-vec model is provided for illustration purposes only. Other types of models may be used for tokenizing characteristics.

In other examples, the feature extractor 108 may identify attributes associated with data entities, tokenize the attributes, and generate one or more feature vectors that correspond to the entities. For example, the feature extractor 108 may identify data entities associated with a marketing campaign that include tables, arrays, files, sets, fields, and/or other types of data objects that characterize products, customers, groups of potential customers, and the like. The feature extractor 108 may then identify, within these various data objects, attribute names, attribute definitions, attribute descriptions, permitted field values and/or permitted field value types (e.g., integer, string, alphanumeric characters). The feature extractor 108 may then process the identified entities, entity types, and/or attributes to generate one or more feature vectors.

The feature extractor 108 may append other features to the generated feature vectors. In one example, a feature vector may be represented as $[f_1, f_2, f_3, f_4]$, where $f_1, f_2, f_3$ correspond to characteristic tokens and where $f_4$ is a non-characteristic feature. Example non-characteristic features may include, but are not limited to, a label quantifying a weight (or weights) to assign to one or more characteristics of a set of characteristics described by a feature vector. In some examples, a label may indicate one or more classifications associated with corresponding characteristics.

As described above, the system may use labeled data for training, re-training, and applying its analysis to new (target) data. The feature extractor 108 may optionally be applied to new "target" data (i.e., yet to be analyzed) to generate feature vectors from the new data. These new data feature vectors may facilitate analysis of the new data by one or more ML models, as described below. In the examples described below, the "new" data may be that of customer engagements in response to a digitally executed marketing campaign. For example, target data may account for sales (or "conversions"), views, clicks, customer identifiers (e.g., email address, account identifier), and other similar data for customers that have provided digital marketing materials in a campaign or a phase of a campaign.

In some examples, the training logic 112 receives a set of data items as input (i.e., a training corpus or training dataset). Examples of data items include, but are not limited to, data entities (e.g., structures and/or objects, such as fields, arrays, tables, rows) associated with digital marketing materials, customer attributes of a particular customer segment to which the digital marketing materials were transmitted, and the number and types of user engagements (e.g., clicks, views, conversions, deletions) associated with the digital marketing materials transmitted to the customers of the customer segment. The data items used for training may also be associated with one or more attributes, such as those described above in the context of the feature extractor 108 (e.g., field names, field values, field value types).

In one example, the system may train a natural language processing (NLP) machine learning (NLP) model to recognize common language terms. Once trained to recognize natural language, the model may then use NLP processing to interpret natural language aspects of data entity attributes.

The system may train an NLP model using, for example, a publicly available natural language processing (NLP) dataset. Examples of publicly available NLP datasets include, but are not limited to, those available from commoncrawl (commoncrawl.org) and Wikipedia®. The system may access industry-specific NLP training datasets. Examples include, but are not limited to those available from Luminati, University of California Irvine, and Kaggle. The system may also access pre-trained NLP models that include, but are not limited to, Google® BERT, Microsoft® CodeBERT®, among others.

In some examples, training data used by the training logic 112 to train the machine learning engine 110 includes feature vectors of data items that are generated by the feature extractor 108, described above.

The training logic 112 may be in communication with a user system, such as clients 102A, 102B. The clients 102A, 102B may include an interface used by a user to apply labels to the electronically stored training dataset.

The entity analyzer 114 may retrieve, access, and/or analyze entities. In some examples, the entity analyzer 114 may cooperate with the feature extractor 108 to detect entity attributes and convert the attributes into a corresponding feature vector. Before describing the entity analyzer 114 itself, the following describes various examples of entities on which the entity analyzer 114 may operate.

Examples of an entity may include any number of different types of data structures. In its most general sense, an entity is a discrete representation of one or more attributes and/or corresponding attribute values that are associated with one another. In one example, an entity may be a collection of attributes characterizing an "event." Examples of an event represented by an entity may include a particular customer, a particular segment or group of customers, an event or group of events, a transaction or group of transactions, and the like. By storing attributes for these different types of events, an entity may be used to analyze the corresponding event using some of the techniques described below.

In one example, an entity may be instantiated as a row and/or a table data structure that stores attribute values for a corresponding event. In another example, an entity may be instantiated as a collection of metadata that describes the various attributes/attribute parameters. In yet another example, an entity may be instantiated as a plain text file (e.g., a "flat file") or a binary file that may be processed, compiled, or otherwise rendered by executable code. In still another example, an entity may be a multi-component data structure that includes binary data that is rendered upon execution of object-oriented code (e.g., JAVA®) embedded in the entity along with the binary data. Other data entities may include combinations of any of these data structures.

In one illustration, an entity may be a collection of attributes describing a particular marketing campaign event, such as a promotional email distribution. In this example, the attributes could include a number of transmitted emails associated with the campaign (e.g., distributed in a first campaign event during a defined window of time), key words that represent a summary or title of the discrete mailing ("10% discount on tents," or "first month free"), and attributes describing the recipients (e.g., demographic and/or geographic data). Attributes associated with the recipients may include an identifier of a particular recipient and corresponding geographic and/or demographic attributes, product preferences and/or purchase history attributes. The entity may also include attributes that characterize the subject of the electronic marketing. These attributes may include a communication channel associated with the marketing materials (e.g., email, text, iframe advertisement, promotional discount), and the attributes of the product being marketed (e.g., product type, color, size, part number, product line).

Furthermore, an entity for a particular recipient of electronic marketing materials may also store attributes that denote one or more responses from the recipient to the electronic marketing materials. In some examples, the entity may include attributes characterizing the type of engagement (if any) such as whether the materials were accessed merely by impression or a more active level of engagement (e.g., open an email, click, conversion).

In some examples, attributes and their corresponding values are stored in a table data object that is conveniently transmitted and/or analyzed according to the techniques described herein.

Data in this example, among others, may be voluminous and difficult to efficiently analyze. While the volume of entity data makes analysis difficult, at the same time the specificity of the entity data could enable a precise and perceptive analysis. However, even with advanced ML techniques, drawing precise and accurate analytical results from entity data is challenging. As described below, a compact vector representation of entities improves the efficiency analyzing entity data as well as the accuracy of analytical conclusions drawn from entity data.

Continuing with the description of FIG. 1, the vector compression engine 116 includes systems that execute the operations depicted in FIG. 2 to generate condensed vector representations of entity data. In various examples, the vector compression engine may include executable code or binary code that is compiled to execute the operations shown in FIG. 2.

At a high level, the vector compression engine 116 accesses entity vectors (generated by the entity analyzer 114 optionally in cooperation with the feature extractor 108) and transforms the vectors into representations in latent vector space. The vector compression engine 116 also selects reference vectors and determines distance measurements between entity vectors and each of the reference vectors. The vector compression engine 116 may generate the distance measurements using cosine similarity analysis, among other techniques. This first aspect of compression (in addition to any compression gained from transformation into latent vector space) itself improves the efficiency of ML analysis. In a second stage of compression, the entity analyzer 114 may also execute statistical analyses that characterize the distances between entity vectors and each of the reference vectors. These statistical characteristics may then be used to characterize the vectors.

The campaign engine 117 uses various elements of the system 100, including the outputs from the vector compression engine, to devise and execute electronic marketing campaigns. In some examples, the campaign engine 117 may receive a selection of campaign parameters from a user. These campaign parameters may include examples of the customer segment to be marketed to, the communication channels to be used to transmit marketing materials, products to be marketed, promotions, and the like.

Upon receiving the parameters, the campaign engine 117 may use a trained ML model within the campaign engine itself to identify, for example, specific entities (e.g., corresponding to customer attributes) to transmit the marketing materials to. In other examples, the campaign manager 117 may operate in an inverse matter. That is, a user may provide characteristics of the customers to be marketed to and the trained ML model of the campaign engine may determine the attributes of the marketing campaign itself that are most likely to generate positive results (e.g., a high level of engagements/conversions).

As mentioned above, the campaign engine 117 may include a trained machine learning (ML) model that analyzes the compressed vectors generated according to operations described below to generate electronic marketing campaigns. The ML model may itself be trained using the training logic 112.

The trained machine learning model operating as an element of the campaign engine 117 may be implemented using one or more other types of ML models. In some examples, an ML model may include one or both of supervised machine learning algorithms and unsupervised machine learning algorithms. In some examples, a neural network model may be a component of one or more of the entity analyzer 114, the vector compression engine 116, and/or the campaign engine 117. In other examples, any one or more of linear regression, logistic regression, linear discriminant analysis, classification and regression trees, naïve Bayes, k-nearest neighbors, learning vector quantization, support vector machine, bagging and random forest, boosting, back propagation, and/or clustering models may be adapted to perform the techniques described herein. In some examples, multiple trained ML models of the same or different types may be arranged in a ML "pipeline" so that the output of a prior model is processed by the operations of a subsequent model. In various examples, these different types of machine learning algorithms may be arranged serially (e.g., one model further processing an output of a preceding model), in parallel (e.g., two or more different models further processing an output of a preceding model), or both.

The campaign engine 117 may communicate with other elements of the system 100, including network communication systems (described below) and storage devices, to administer and transmit electronic marketing communications.

Other configurations of the machine learning application 104 may include additional elements or fewer elements.

The frontend interface 118 manages interactions between the clients 102A, 102B and the ML application 104. In one or more embodiments, frontend interface 118 refers to hardware and/or software configured to facilitate communications between a user and the clients 102A, 102B and/or the machine learning application 104. In some embodiments, frontend interface 118 is a presentation tier in a multitier application. Frontend interface 118 may process requests received from clients and translate results from other application tiers into a format that may be understood or processed by the clients.

For example, one or both of the client 102A, 102B may submit requests to the ML application 104 via the frontend interface 118 to perform various functions, such as for labeling training data and/or analyzing target data. In some examples, one or both of the clients 102A, 102B may submit requests to the ML application 104 via the frontend interface 118 to view a graphic user interface related to analysis of a schema. In still further examples, the frontend interface 118 may receive user input that re-orders individual interface elements.

Frontend interface 118 refers to hardware and/or software that may be configured to render user interface elements and receive input via user interface elements. For example, frontend interface 118 may generate webpages and/or other graphical user interface (GUI) objects. Client applications, such as web browsers, may access and render interactive displays in accordance with protocols of the internet protocol (IP) suite. Additionally or alternatively, frontend interface 118 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In an embodiment, different components of the frontend interface 118 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the frontend interface 118 is specified in one or more other languages, such as Java, C, or C++.

The action interface 120 may include an API, CLI, or other interfaces for invoking functions to execute actions. One or more of these functions may be provided through cloud services or other applications, which may be external to the machine learning application 104. For example, one or more components of machine learning application 104 may invoke an API to access information stored in a data repository (e.g., data repository 124) for use as a training corpus for the machine learning engine 104. It will be appreciated that the actions that are performed may vary from implementation to implementation.

In some embodiments, the machine learning application 104 may access external resources 134, such as cloud services. Example cloud services may include, but are not limited to, social media platforms, email services, short messaging services, enterprise management systems, and other cloud applications. Action interface 120 may serve as an API endpoint for invoking a cloud service. For example, action interface 120 may generate outbound requests that conform to protocols ingestible by external resources.

Additional embodiments and/or examples relating to computer networks are described below in Section 5, titled "Computer Networks and Cloud Networks."

Action interface 120 may process and translate inbound requests to allow for further processing by other components of the machine learning application 104. The action interface 120 may store, negotiate, and/or otherwise manage authentication information for accessing external resources. Example authentication information may include, but is not limited to, digital certificates, cryptographic keys, usernames, and passwords. Action interface 120 may include authentication information in the requests to invoke functions provided through external resources.

In one or more embodiments, the data repository 124 may be any type of storage unit and/or device (e.g., a file system, database, collection of tables, or any other storage mechanism) for storing data. Further, the data repository 124 may include multiple different storage units and/or devices. The multiple different storage units and/or devices may or may not be of the same type or located at the same physical site. Further, the data repository 124 may be implemented or may execute on the same computing system as the ML application 104. Alternatively or additionally, the data repository 124 may be implemented or executed on a computing system separate from the ML application 104. Data repository 124 may be communicatively coupled to the ML application 104 via a direct connection or via a network.

In the embodiment illustrated in FIG. 1, the data repository 124 includes an entity store 126, a vector store 128, and a campaign store 130. These stores represent the storage of particular data resources that may be accessed by the system 100 to execute the operations depicted in FIG. 2. For example, the entity store 126 may store entities and their corresponding attributes that may be accessed by the entity analyzer 114. In some examples, entities and/or their corresponding attributes may be logically related to one another using one or more keys (e.g., primary key, foreign key) to facilitate any of the operations described herein. The vector store 128 may store any and/or all of the various types of vectors described herein. For example, the vector store 128 may store feature vectors that represent entities and/or groups of entities. The vector store 128 may also store any of the vectors described below in the context of FIG. 2, such as latent vectors space representations of vectors, and any of the various forms of compressed vectors. The campaign store may store criteria provided by a user to generate a campaign, such as product and/or recipient attributes, campaign communication channels, and the like. In some examples, the campaign store 130 may also store the marketing materials transmitted, records of user engagements (accessible by the campaign engine 117), recipient identifiers, and campaign details (e.g., products, promotions, marketing manager descriptions).

Information related to target data items and the training data may be implemented across any of components within the system 100. However, this information may be stored in the data repositories 122, 126 for purposes of clarity and explanation.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Generating a Compact Data Representation

FIG. 2 illustrates an example set of operations, collectively referred to as the method 200, for generating a compact data representation in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

At a high level, embodiments use vectors that represent a subset of entities selected from a set of entities as "reference vectors." These reference vectors define a coordinate system in latent vector space. The system uses this coordinate system to characterize each of the vectors for the entities of the set relative to the reference vectors. As described below in more detail, the characterizations of the vectors of the set are condensed into a data-efficient form without loss of data for the set of entities as a whole. In some examples, a dozen or two dozen vectors with fewer than 100 dimensions (i.e., attributes) may accurately characterize a set of millions of vectors each of which includes thousands of dimensions. Using the techniques described herein to condense entity vector data reduces computing resource consumption by trained ML models, and improves computing resource speed and efficiency without loss of accuracy or precision.

In some examples, the trained ML models may operate on the condensed entity vectors to generate a prediction or recommend an action associated with a condensed entity vector and/or an entity associated with the condensed entity vector. Because the condensed entity vectors require a lower level of computing power to analyze, the trained ML model may generate a recommended action and/or prediction more quickly and more efficiently than possible when operating on conventional feature vectors. Many of the examples that follow describe the improved analysis of an ML model on a condensed entity vector in the context of electronic marketing. These examples are selected for convenience, and it will be appreciated that other applications are also possible. For example, a trained ML model (e.g., trained using a set of condensed entity vectors) may analyze attributes of an entity to recommend (i.e., predict) an operation to be performed on the entity. In one illustration, an entity representing a data item may be analyzed by an ML model trained with analogous condensed entity vectors, which then recommends a particular logical storage location for the entity. In another example, an entity representing a received electronic communication may be analyzed by an ML model trained with analogous condensed entity vectors, which then recommends a particular response and/or response wording to be transmitted to the sender of the received electronic communication. Alternatively the message may be routed to other machine learning models, operations, and/or operators based on the analysis and resulting recommendation of the trained ML model.

The method 200 may begin by generating a set of vectors representing a corresponding set of entities, where the values within the vectors represent entity attributes (operation 204). As described above in the context of FIG. 1, an entity may be a data structure that represents attributes associated with an event. As also described above, the system may "tokenize" the entity attributes as a precursor to generating a vector that represents an entity.

The system may generate a vector representing an entity using the various tokens associated with a particular entity. The system may generate vectors for the entities using any of the techniques described above in the context of FIG. 1. The vectors generated by the system may include values that represent the attributes of the corresponding entities. The system may repeat this process for each entity in a set of entities and thereby generate a set of vectors, each of which represents an entity (in the set of entities) to be analyzed.

Once the system generates the vectors that represent the entities, the system may begin the process of generating a compact (and "lossless") data representation of the entities by selecting a subset of vectors from the set of vectors representing the entities that is generated in the operation 204 (operation 208). Because in subsequent operations of the method 200 the system transforms entity vectors in the set to be defined relative to the subset of vectors, the vectors of the subset are referred to as "reference vectors."

The reference vectors may be selected from the set of vectors using any methodology or technique. In some examples, the subset of vectors is selected randomly using any convenient computing technique. In other examples, the subset of vectors may be selected based on an arbitrarily selected criteria that is unrelated to the attributes of the entities. This selection criteria may have the effect of randomly selecting entities even though specific selection criteria are applied. For example, the system may select the subset of vectors based on a value of a last digit in a timestamp associated with the vector generation time. In another example, the system may select the subset of vectors based on the value of a digit in a hash value (e.g., MD5, SHA2) of entity metadata. The system may use any other computationally efficient technique to randomly select reference vectors from the set of vectors.

The system may select any number of reference vectors that is less than the entire set of vectors. The number of reference vectors selected may be based on (1) providing enough specificity by which to define vectors of the set of vectors and (2) reducing the number of attributes in a transformed vector by over 90% relative to a number of attributes in an entity (or corresponding vector). In some examples, the system selects a number of reference vectors using traditional measures of statistical confidence. For example, when a number of analyzed data items is sufficient to form a normal distribution, a sample size of over 20 or over 35 is generally a statistically significant sample size. That is, the statistical characteristics of the sample (e.g., mean, average, mode, median, standard deviation) are within an 80% or 85% confidence interval of those same statistical characteristics of the entire distribution. In some of the embodiments described herein, 30 to 35 reference vectors may be used to generate a compact representation of tens of millions of entity vectors.

The system then uses the selected reference vectors as the "coordinate axes" of a latent vector space (operation 212). That is, the set of vectors are mapped into a latent vector space defined by the reference vectors and the system then transforms the vectors of the set into the latent vector space. The system then generates distance values from each vector of the set relative to each of the reference vectors in the latent vector space (operation 212). The sub-operations for this condensing transformation are described below in the context of operations 216-228.

The system may map the vectors of the set (including the reference vectors) into latent vector space using any convenient technique (operation 212). Rendering the vectors in latent vector space enables vectors with similar collections of attributes to be proximate to one another and vectors with disparate collections of attributes to be distant from one another in n-dimensional space. The system may use any of a number of techniques to render the vectors in latent vector space, including but not limited to auto encoders, contrastive learning mechanisms, and a variety of self-supervised learning approaches.

Using latent vector space has several practical advantages. For example, analyzing vectors in latent vector space enables the system to identify combinations of attributes that are most influential on a result. Using this aspect of latent vector space, the system may reduce a number of analyzed attributes from the full set of vector attributes to only the most influential attributes. This improves computing efficiency and speed. Another benefit is that latent vector space improves the ability of the system to analyze attributes that have discrete values rather than continuous values. For example, attributes such as age quantified in years, gender, zip code have non-continuous, discrete values. The nature of latent vector space improves the analytical of ability of the system when analyzing vectors because these attributes appear more continuous in latent vectors space.

The system then may compute distance values between each of the vectors of the set relative to each of the reference vectors (operation 216). In this way, each of the vectors of the full set may be represented by its distance to each of the reference values. In effect, this further reduces a number of attributes within each of the vectors of the set that is equal to the number of reference vectors. While the method 200 will further condense the number of attributes in the vectors of set, the operation 216 may reduce the number of attributes in a vector from hundreds or thousands to tens.

In an illustration of this operation, the vectors of the set may be analogized to or represented as corresponding rows in a table data structure. The individual attributes in each vector may be analogized to or represented as corresponding columns in the table data structure. In this characterization, the operation 216 reduces the number of columns to be processed by later operations of the method 200.

The system may generate distance values using any of a number of vector distance computation methods. For example, the system may use any one or more of a Euclidean distance function, a cosine similarity function, dot product, among others.

The method 200 continues by condensing the distance values for each of the vectors generated in the operation 216 (operation 220). The operation 220, explained via sub-operations 224 and 228, may be thought of as reducing the number rows in the table data structure, further improving the computing efficiency of the system.

The operation 220 begins with the vectors generated in the preceding elements. Namely, the number of vector attributes being processed by the system has been reduced from a number of attributes associated with an entity (hundreds, thousands) to the number of reference vectors (tens). With the following operations, the system reduces a total number of vectors analyzed. To continue with the analogy to table data described above, the system executes the operation 220 and its sub-operations 224, 228 to reduce the number rows in a table.

The system begins condensing the distance values ("column" data) by characterizing distance values in each column by one or more statistical measurements exhibited by the distance values in each column. In other words, the system generates statistical values such as mean, standard deviation, minimum value, maximum value for the collection (or "distribution") of distance values between the various non-reference vectors and each particular one of the reference vectors.

Other examples of statistical characteristics that the system calculates may include various percentile values of the distribution of distance values to a particular reference vector (e.g., $10^{th}$ percentile, $40^{th}$ percentile, $50^{th}$ percentile). In still another example, the system may fit one or more statistical distributions to the distance values to each particular one of the reference vectors. In one illustration, the system may fit one or more of a normal distribution, an exponential distribution, and/or a beta distribution to the distance values. The parameters that characterize the fitted distribution may then be used as the statistical characteristics representing the distance values to each particular one of the reference vectors. For example, once a normal distribution is fit to the distance values, a mean value and a standard distribution that define the shape of the distribution would be selected. In some examples, the system may fit any number of statistical distributions to the distance values and select the best fitting distribution and its corresponding characteristics.

In the illustration above, in which a normal distribution is fit to the distance data, each instance of column data (i.e., each value for that column corresponding to a row of a non-reference entity vector) may be summarized by only two characteristic values: the mean and standard deviation of the normal distribution. This is because these two values fully characterize a normal distribution. Other distributions fit to these distance values may be fully characterized using different parameters. In still other examples, the system may use any number of other statistical characteristics, such as a combination of mean, standard deviation (or other measure of variability), decile/percentile values, among others, to characterize the distance data between the remaining rows of entity vectors to a particular one of the reference vectors.

The system generates a summary vector based on the statistical characteristics generated in the operation 224 (operation 228). The system may generate the vector using any of the tokenization and vector generation techniques described above.

The summary vector generated by the operation 228 is a condensed representation of the entity vectors initially processed in the operation 204. The use of summary vectors improves the speed and efficiency of computing resources because rather the system (e.g., a trained ML model) analyzing millions of entity vectors, each with hundreds or thousands of attributes, the system may instead analyze 50 or fewer summary vectors, each with 20 or fewer attributes. In some examples, the degree of vector/attribute condensation is significant. In some examples, the number of vectors and/or attributes may be less than 1 percent (%) or even less than 0.1% of the original number of entities and/or entity attributes.

The preceding operations may be optionally applied to the efficient training of a machine learning model that executes an electronic marketing campaign (operation 232). For example, the system may generate a training dataset with which to train the machine learning model (operation 236). The training dataset may include the summary vectors that represent the statistical characteristics of the distribution (or population) of distance values between non-reference vectors and reference vectors (operation 236). The training dataset may also include statistics associated with marketing campaigns that are targeting the entities used by the system to generate the summary vectors. These statistics may include overall rates of engagement, specific rates of engagement that correspond to different types of engagement (e.g., views versus conversions), types of marketing communication channels used (social media, email, iframe advertising, text), and the like.

Once the training is completed, the system may apply the trained machine learning model to construct the digital marketing campaign (operation 240). For example, the trained machine learning model may be applied to attributes of a particular entity to determine or select a marketing campaign for that entity. In another example, the trained machine learning model may be applied to attributes of a marketing campaign to select attributes of entities to target with the marketing campaign. The selection criteria may be based on machine learning predictions of success rates (e.g., engagements, conversions) associated with combinations of entity attributes. In some examples, the selection criteria may be based on machine learning predictions of success rates (e.g., engagements, conversions) based on any of the entity attributes, combined with one or more selections of marketing communication channel, product attributes, and the like.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figures 3A, 3B, 3C, 3D:
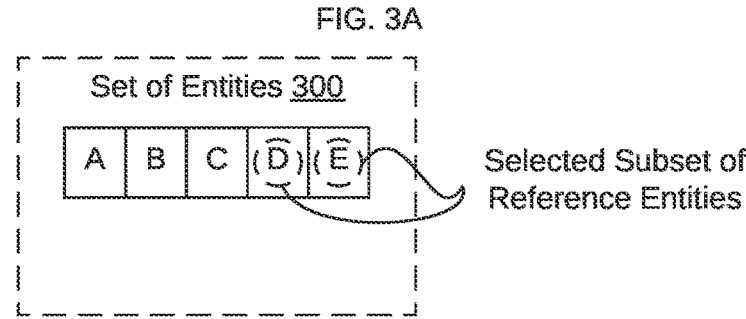
FIGS. 3A-3D illustrates an example applying the operations shown in FIG. 2 for generating a compact data representation in accordance with one or more embodiments.

FIG. 3A is a schematic illustration of a set of entities 300 that includes entities A, B, C, D, and E. These entities A, B, C, D, and E may include any one or more of the features of entities described above. Entities D and E are indicated in the figure as "reference entities." The reference entities D and E are selected for use as reference vectors upon being represented in vector form.

FIG. 3B schematically illustrates a latent vector space 304 and the latent vector representations of vectors corresponding to entities A, B, C, D, and E. These vectors will be referred to simply as vectors A, B, C, D, and E for brevity. The schematic illustration of latent vector space 304 may be n-dimensional, where n is a number of dimensions that is based on the number of attributes stored in the entities.

The lines representing vectors A, B, C, D, and E are solid to indicate their status as vectors. Labels "D" and "E" are circled to indicate their status as reference vectors. Double headed and dashed lines between E and A, E and B, E and C, D and A, D and B, D and C represent distance measurements between the corresponding vectors. As described above in the context of operations 216, these distance measurements may be used in a first phase of data condensation. These various distance measurements are shown in the table of FIG. 3C.

FIG. 3D depicts a second stage of vector data condensation. As described above in the context of the operations 220-228, the vector distance values shown in FIG. 3C are characterized using statistical characteristics. In this case, the data is a normal distribution characterized by mean, median and standard deviation. These three values may be used to generate a summary vector representing the distance values from the non-reference vectors to each of reference vector D and E. The three values (attributes) of the summary vector accurately characterize the entities (and their corresponding vector representations) regardless of the number of attributes in the entities.

In one specific illustration, a marketing campaign may have 10 million customers in a segment that is targeted for marketing. Each of the 10 million entities (each of which corresponds to one of the 10 million customers) may have, for purposes of this illustration, more than 100 attributes. Applying the method 200, the system may select, for the purposes of this illustration, 35 reference vectors (corresponding to 35 entities of the 10 million). All of the reference and non-reference vectors may be converted to latent vector space representations with approximately 100 attributes (e.g., n-dimensional latent vector space where n=100). The distance values between the non-reference vectors and the reference vectors may be generated and condensed to 35 sets (corresponding to the 35 reference vectors) of 13 statistical metrics (e.g., mode, average, median, decile values, standard deviation), each with a single numerical value. By applying the method 200, the 10 million customers may be represented by 35 vectors with 13 values for a total 455 values. This is in contrast to the more than 1 billion values in the original entity set.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
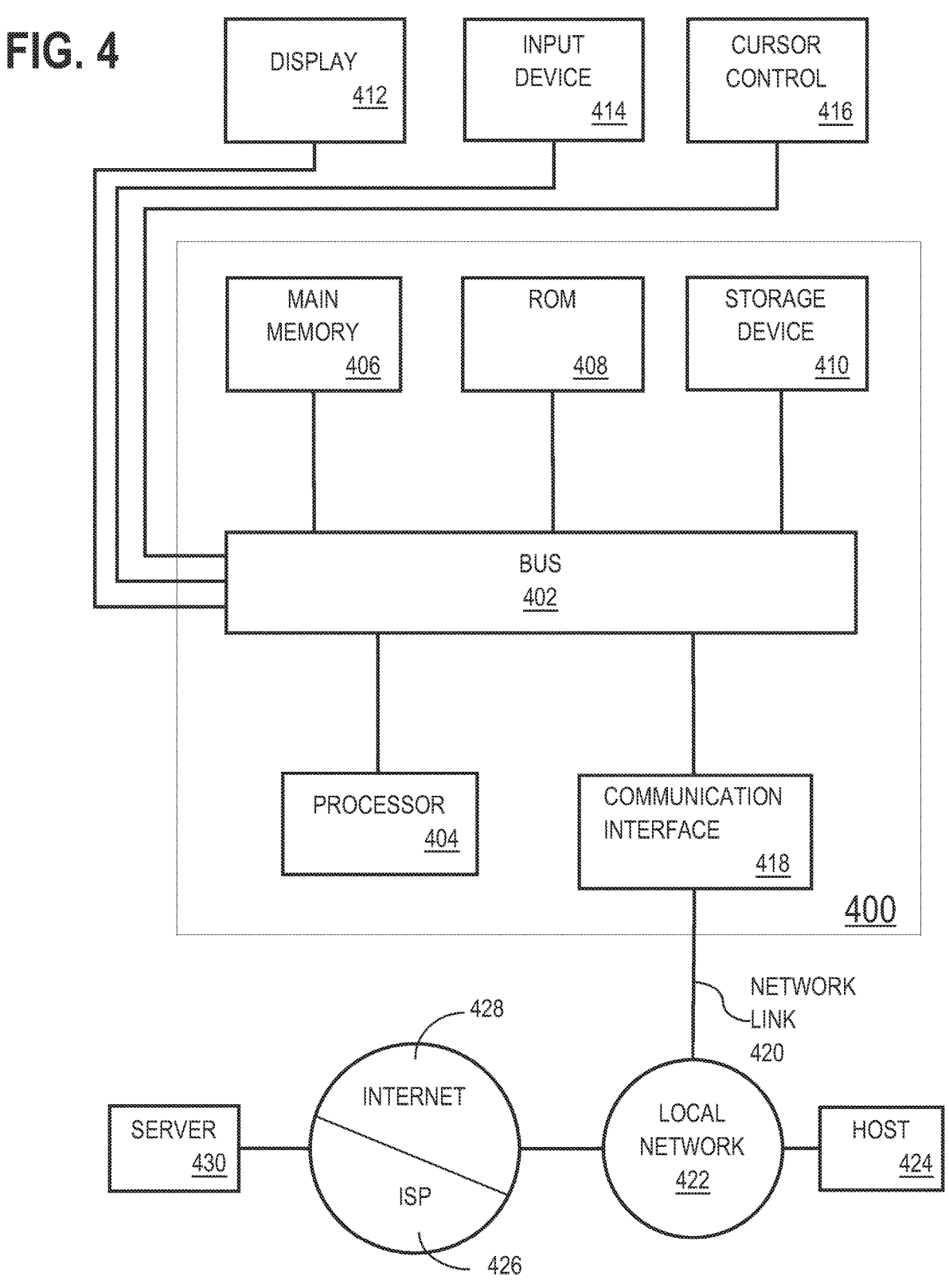
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface

418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:

generating a compact representation of a plurality of entities for training a machine learning model, wherein generating the compact representation comprises:

generating a plurality of vectors representing the plurality of entities, wherein values of vectors of the plurality of vectors represent attributes corresponding to entities of the plurality of entities;

selecting a subset of reference vectors, from the plurality of vectors, representing a subset of reference entities from the plurality of entities;

generating a plurality of summary vectors that (a) comprises at least an order of magnitude fewer vectors than the plurality of vectors and (b) accurately represents the plurality of entities, at least by performing, for each reference vector of the subset of reference vectors:

computing distance values between each non-reference vector selected from the plurality of vectors and a particular reference vector; and condensing the distance values at least by:

generating statistical characteristics representing the distance values in relation to the particular reference vector; and based on the statistical characteristics, generating a summary vector representing the distance values in relation to the particular reference vector;

wherein the compact representation of the plurality of entities comprises the plurality of summary vectors representing the distance values in relation to each of the subset of reference vectors; and training the machine learning model using the compact representation of the plurality of entities instead of the plurality of vectors, wherein training the machine learning model comprises:

generating a training set comprising (a) the plurality of summary vectors representing the distance values in relation to each of the subset of reference vectors and (b) statistics associated with marketing campaigns targeting the plurality of entities; and training the machine learning model using the training set.

2. The one or more non-transitory computer-readable media of claim 1, further comprising applying the trained machine learning model to attributes of a target entity to select an action associated with the target entity.

3. The one or more non-transitory computer-readable media of claim 1, further comprising applying the trained machine learning model to attributes of a target entity to select a marketing campaign for the target entity.

4. The one or more non-transitory computer-readable media of claim 1, further comprising applying the trained machine learning model to attributes of a marketing campaign to select attributes of entities to be targeted using the marketing campaign.

5. The one or more non-transitory computer-readable media of claim 1, wherein a first number of entities in a subset of entities corresponding to the subset of reference vectors is less than 1 percent of a second number of entities in the plurality of entities.

6. The one or more non-transitory computer-readable media of claim 1, wherein the statistical characteristics comprise one or more of a standard deviation, a mean value, a minimum distance, and a maximum distance.

7. The one or more non-transitory computer-readable media of claim 1, wherein selecting the subset of reference vectors comprises randomly selecting a subset of entities as reference entities from the plurality of entities in preparation for generating a corresponding subset of reference vectors.

8. The one or more non-transitory computer-readable media of claim 1, wherein the summary vector for each particular reference vector represents attributes of all of the plurality of entities.

9. A method comprising:

generating a compact representation of a plurality of entities for training a machine learning model, wherein generating the compact representation comprises:

generating a plurality of vectors representing the plurality of entities, wherein values of vectors of the plurality of vectors represent attributes corresponding to entities of the plurality of entities;

selecting a subset of reference vectors, from the plurality of vectors, representing a subset of reference entities from the plurality of entities;

generating a plurality of summary vectors that (a) comprises at least an order of magnitude fewer vectors than the plurality of vectors and (b) accurately represents the plurality of entities, at least by performing, for each reference vector of the subset of reference vectors:

computing distance values between each non-reference vector selected from the plurality of vectors and a particular reference vector; and condensing the distance values at least by:

generating statistical characteristics representing the distance values in relation to the particular reference vector; and based on the statistical characteristics, generating a summary vector representing the distance values in relation to the particular reference vector;

wherein the compact representation of the plurality of entities comprises the plurality of summary vectors representing the distance values in relation to each of the subset of reference vectors; and training the machine learning model using the compact representation of the plurality of entities instead of the plurality of vectors, wherein training the machine learning model comprises:

generating a training set comprising (a) the plurality of summary vectors representing the distance values in relation to each of the subset of reference vectors and (b) statistics associated with marketing campaigns targeting the plurality of entities; and training the machine learning model using the training set;

wherein the method is performed by at least one device including a hardware processor.

10. The method of claim 9, further comprising applying the trained machine learning model to attributes of a target entity to select an action associated with the target entity.

11. The method of claim 9, further comprising applying the trained machine learning model to attributes of a target entity to select a marketing campaign for the target entity.

12. The method of claim 9, further comprising applying the trained machine learning model to attributes of a marketing campaign to select attributes of entities to be targeted using the marketing campaign.

13. The method of claim 9, wherein a first number of entities in a subset of entities corresponding to the subset of reference vectors is less than 1 percent of a second number of entities in the plurality of entities.

14. The method of claim 9, wherein the statistical characteristics comprise one or more of a standard deviation, a mean value, a minimum distance, and a maximum distance.

15. The method of claim 9, wherein selecting the subset of reference vectors comprises randomly selecting a subset of entities as reference entities from the plurality of entities in preparation for generating a corresponding subset of reference vectors.

16. The method of claim 9, wherein the summary vector for each particular reference vector represents attributes of all of the plurality of entities.

17. A system comprising:

at least one device including a hardware processor;

the system being configured to perform operations for generating a compact representation of a plurality of entities for training a machine learning model, the operations comprising:

generating a compact representation of a plurality of entities for training a machine learning model, wherein generating the compact representation comprises:

generating a plurality of vectors representing the plurality of entities, wherein values of vectors of the plurality of vectors represent attributes corresponding to entities of the plurality of entities;

selecting a subset of reference vectors, from the plurality of vectors, representing a subset of reference entities from the plurality of entities;

generating a plurality of summary vectors that (a) comprises at least an order of magnitude fewer vectors than the plurality of vectors and (b) accurately represents the plurality of entities, at least by performing, for each reference vector of the subset of reference vectors:

computing distance values between each non-reference vector selected from the plurality of vectors and a particular reference vector; and condensing the distance values at least by:

generating statistical characteristics representing the distance values in relation to the particular reference vector; and based on the statistical characteristics, generating a summary vector representing the distance values in relation to the particular reference vector;

wherein the compact representation of the plurality of entities comprises the plurality of summary vectors representing the distance values in relation to each of the subset of reference vectors; and training the machine learning model using the compact representation of the plurality of entities instead of the plurality of vectors, wherein training the machine learning model comprises:

generating a training set comprising (a) the plurality of summary vectors representing the distance values in relation to each of the subset of reference vectors and (b) statistics associated with marketing campaigns targeting the plurality of entities; and training the machine learning model using the training set.

18. The system of claim 17, the operations further comprising applying the trained machine learning model to attributes of a target entity to select an action associated with the target entity.

19. The system of claim 17, the operations further comprising applying the trained machine learning model to attributes of a target entity to select a marketing campaign for the target entity.

20. The system of claim 17, the operations further comprising applying the trained machine learning model to attributes of a marketing campaign to select attributes of entities to be targeted using the marketing campaign.

* * * * *